United States Patent [19]

Tuggle

[11] 4,356,786
[45] Nov. 2, 1982

[54] HYDROFOIL BOAT

[76] Inventor: Gordon P. Tuggle, P.O. Box 6522, Portsmouth, Va. 23703

[21] Appl. No.: 80,125

[22] Filed: Sep. 27, 1979

[51] Int. Cl.³ ............................................. B63B 1/28
[52] U.S. Cl. .................................. 114/280; 114/283; 114/281; 244/46
[58] Field of Search ......................... 114/274–283, 114/56; 440/37; 244/46

[56] References Cited

U.S. PATENT DOCUMENTS

| | | | |
|---|---|---|---|
| 1,195,495 | 7/1915 | Erlandsen | 114/280 |
| 2,491,744 | 12/1949 | Link | 114/280 |
| 3,139,059 | 6/1964 | Hanford | 114/282 |
| 3,165,084 | 1/1965 | Gongwer | 114/278 |
| 3,213,818 | 10/1965 | Barkley | 114/280 |
| 3,227,123 | 1/1966 | Voigt | 114/276 |
| 3,324,815 | 6/1967 | Morales | 114/280 |
| 3,342,155 | 9/1967 | Hook | 114/280 |
| 3,710,747 | 1/1973 | Guidi | 114/280 |
| 4,048,939 | 9/1977 | Jones | 114/274 |

Primary Examiner—Trygve M. Blix
Assistant Examiner—D. W. Keen
Attorney, Agent, or Firm—William Jay Monahan

[57] ABSTRACT

An improved utility class hydrofoil boat having an integrated hydrofoil suspension and steering system wherein pairs of foils may be inclined at various angles, to the lateral axis of the boat, converting from surface piercing to submerged type foils when operated in concert and, in combination with the production of a yawing force about the vertical axis, may be used to produce coordinated turns by introducing a differential in the angle of inclination between starboard and port foils or by introducing a differential in the sweepback angle between starboard and port foils. In the preferred embodiment, a symmetrical, submerged tail foil having a positive dihedral is rotated to produce a yawing moment in proportion to the bank produced by manipulation of the pairs of foils, resulting in coordinated, banked turns with a single control movement. The foils incorporate a swivelable, shearable connection allowing them to streamline and convert to skis if the lower portion of the foils should strike a submerged object. This boat also combines modular construction, ducted fan propulsion, synchronous belt drive, sealed components, convertability to a self-trailering configuration, use of lightweight, non-corrosive materials, and simple controls to provide simple, safe, stable, energy-efficient, low-cost, quiet, high speed water transportation, capable of operation in varied water surface conditions.

30 Claims, 21 Drawing Figures

SECTION A-A

SECTION B-B

HYDROFOIL BOAT

BACKGROUND OF THE INVENTION

This invention relates to an integrated hydrofoil suspension and steering system in a hydrofoil boat utilizing many other individual features in combination to improve safety, simplicity and economy of operation and of construction. More particularly, the invention relates to a hydrofoil suspension and steering system producing coordinated, aircraft type turns. The preferred embodiment includes one or more pairs of foils arranged on opposite sides of the longitudinal axis of the boat which may be controlled simultaneously to convert from a submerged to a surface piercing configuration. Starboard and port foils may also be controlled independently in conjunction with the production of a proportional yawing moment to produce coordinated turns with a single control movement.

Prior art hydrofoil boats have utilized fixed foils in submerged or in surface piercing configuration, and certain advantages accrue to both methods of suspension. Submerged foils produce more lift at lower speed than a surface piercing foil of the same size because of its larger wetted area and the more vertical orientation of the lift vector. However, the lift vector of the surface piercing foil is generally inclined, as viewed from the front, toward the vehicle center of gravity, making the surface piercing foil the more stable configuration. Stability is a factor of some importance, since all hydrofoils are top heavy when foil borne.

In a smaller boat, while it is desirable to become foil borne at as low a speed as possible and to operate the foils when hull borne in a shallow draft or beaching mode, stability must also be considered. Crossing the wakes of other boats, manuevering, and operating at angles to significant wave action are a few examples of operating regimes where stability is desired. The present invention allows the operator of the craft to select the most advantageous mode of operation.

Submerged foils suffer interference drag losses at the intersection of the foil and the supporting strut. At higher speeds, the surface piercing mode of operation is far more efficient, enabling operation at higher speeds and with greater economy than at the submerged mode, since this form of drag can be eliminated. Thus the present invention permits both optimum low and high speed modes of operation.

At constant speed, prior art boats control attitude, height above the surface and trim by control tabs on the foils or by changing foil angle of attack. At constant speed, changing from submerged to surface piercing operation and back, as taught by this invention, raises and lowers the boat in the water and, by operating the foils independently, attitude and trim of the craft can be controlled.

A few prior art boats have utilized differential angles of inclination of hydrofoils to bank the boat. When the foils on one side of the boat are inclined away from the horizontal less vertical lift is produced and the boat lists toward the more vertical foil. However, this maneuver and maneuvers executed by the more conventional (no bank control) hydrofoils, produces a momentary side force opposite to the direction of the turn, the horizontal component of the lift vector of the more vertically inclined foil. Side ventilation of the struts in the submerged mode or foils in the surface-piercing mode can occur during these uncoordinated turns causing increased drag and stress. The subject invention includes the input of a yawing moment about the vertical axis to oppose this side force; avoid side ventilation, reducing drag and stress; and this yaw may also be used to tighten the turn.

Since the present invention utilizes pairs of foils which may be independently inclined from approximately horizontal or parallel to the plane of the lateral and longitudinal axes of the boat to surface-piercing positions at an angle to this plane many factors may be controlled by the operator including draft of the boat at low speed, height above the surface at any given foil borne speed, bank angle for turns, trim and attitude about both lateral and longitudinal axes and stability. Changing the sweep back angle differentially between pairs of foils also permits banking without creating a momentary sideforce opposite to the direction of banking and turning insofar as the lift vectors of the foils are concerned. The less highly swept foil may, depending upon the banked, wetted area of each foil, have a higher drag which will cause yaw without a counteracting yawing moment.

Prior art hydrofoil boats have used conventional rudders to effect turns, incurring a drag penalty during use. This penalty can be significant during a long run with a strong cross wind or current. The present invention includes a rear, symmetrical wing foil of positive dihedral which may be rotated to produce a yawing moment with no loss of total foil lift and no increase in drag.

At higher speeds associated with hydrofoil boats, collisions between the foils and submerged objects are of great concern. Prior art hydrofoils include hinged struts and other methods of releasably rotating the foil support structure, should the foil strike a submerged object. Unfortunately, the prior art does not provide for safe transition to hull borne operation and the danger of cartwheeling or otherwise capsizing is high; particularly in a smaller craft at high speed. Should any main foil of the subject boat strike a submerged object; shearing fasteners fail, allowing the foil to swivel and streamline, converting to a ski; thus permitting a safe, stable deceleration of the craft.

Other features of the boat include modular construction using composite and other non-corrosive, lightweight materials, ducted fan propulsion driven by synchronous belt drive, convertibility to a wheeled trailer and a simple, interconnected control system.

Although the utility and pleasure boat industries are thriving in these days of increased leisure activity and spending for recreational equipment, the hydrofoil runabout or sport craft is conspicuous in its absence from a plethora of other types. In fact, hydrofoils are rarely found among smaller class utility craft. This is even more unusual in the light of the public's desire for increased speed in pleasure craft as evidenced by larger engines, planing hulls and other means of increasing the speed of pleasure craft. The hydrofoil boat is an obvious next step because of its speed and efficiency but no such pleasure or utility craft appear to be in quantity production. It is suggested that this lack is due to the failure of prior art designs to incorporate safety, simplicity and affordability or economy of construction in proper combination.

The instant design makes the hydrofoil boat practical and attractive through a combination of many improvements as described above and by providing aircraft type control; quiet, comfortable operation despite various water surface conditions; simple, practical construction; economical propulsion even at high speeds; safe operation at those high speeds despite the danger of submerged objects, and other practical features such as convertability for self-trailering.

SUMMARY OF THE INVENTION

This integrated hydrofoil suspension and steering system includes main hydrofoils which may be arranged in pairs, opposite each other on either side of the longitudinal axis of the boat. These main foils may be simultaneously inclined at angles to the lateral axis of the craft and to the surface of the water as seen from the front of the boat with the boat held level in the water. Rotating the two main foils together in a plane approximately normal to the longitudinal axis of the boat to change this angle of inclination to the water's surface (hereinafter, angle of inclination) can change the foils from submerged to surface-piercing type foils, selectively controlling directional and lateral stability, longitudinal trim, minimum foil borne speed, foil clearance during hull borne or beaching operations, and rider comfort during rough surface conditions.

For coordinated, banked turns, the main foils may be selectively operated at differing angles of inclination in concert with the movement of a steering mechanism which produces a yawing force about the vertical axis of the vehicle. Alternatively, the main foils may be selectively operated at differing angles of foil sweepback in concert with movement of the steering mechanism. While the steering mechanism could be a conventional rudder or any other control, mounted in a variety of locations, the preferred embodiment consists of a rear, submerged-type foil consisting of a swept wing having positive dihedral and mounted at the bottom end of a strut. This strut, attached at its top to a tail boom, is rotated away from the vertical to steer the craft. Rotation of the rear strut to an angle from the vertical equal to the dihedral angle of the wing plus the bank angle of the boat creates a zero side force (horizontal) rear foil surface and a side force producing (inclined) foil surface which, acting behind the center of gravity, produces yaw.

Sideward motion of a sidearm, aircraft-type control stick produces simultaneous rotation of the rear foil strut for yaw and differential angles of inclination of the two main struts for bank. As the angle of inclination of one main strut is increased in surface piercing operation, it tends to sink lower in the water to continue producing constant lift. At the same time, the angle of inclination of the other strut is decreased and it rises somewhat, needing less wetted area to produce the same or constant lift. Bank is similarly produced in the submerged mode as the more horizontal foil tends to rise and the more vertical foil to sink. Alternatively, increasing the sweepback angle of one foil vis a vis the other will similarly cause the vehicle to list or bank in the direction of the more highly swept strut. Thus, in this mode of operation, sideward motion of the control stick produces simultaneous rotation of the rear foil strut for yaw and increased sweep of one main foil for bank. The end result of a stick left or stick right control input is a coordinated, banked turn, a much safer means of turning such craft at higher speeds. A separate control is used for simultaneous changes in the angle of inclination of the main foils. In like fashion, the boat may be trimmed about its lateral axis using differential angles of foil inclination or sweepback.

The main foils are connected to the vehicle by struts and the upper or outer ends of these main foils are inclined or curled upward. The struts are connected to the foils by a swivelable connection—nearer to the curled or inclined end than to the inboard end of the foil. This swivelable connection is prevented from swiveling by shearing fasteners. Should the foils strike a submerged object, the shearing fasteners fail, allowing the foil to streamline into a water ski configuration, curled or inclined end forward, until the craft is slowed.

The improved hydrofoil boat which uses this integrated hydrofoil suspension and steering system has a modular crew compartment, engine compartment and tail boom which are plastic-foam filled or lined for floatation. All systems are sealed and closed to prevent corrosion and construction materials have been selected with corrosion control and low maintenance in mind. The main foils may be removed and replaced with lightweight wheel assemblies, and the rear strut and foil replaced with a hitch to permit self-trailering. The boat has high intensity and navigation marking lights for night running which convert to tail lights and turn signals in the trailer mode.

The engine, perhaps a rotary engine, is water cooled, sealed and self-contained in its compartment with a quiet exhaust system directed to the outside. A direct, synchronous belt drive, completely shrouded and of, perhaps, the newly designed, high-power, curved tooth profile, is an inexpensive, low maintenance method of power transmission. Ducted fans maintain high propulsive efficiency over a comparatively high range of r.p.m.; they are specially shrouded and designed for safer operation and noise attenuation, and they are not subject to fouling or corrosion. A fuel economy of 2 gallons per hour at a cruising speed of 50 to 60 miles per hour is expected for a small, two-passenger version of the subject invention using this propulsive system.

It is an object of the invention to permit the operator of a hydrofoil boat to select submerged or surface-piercing foil operation.

It is a further object of the invention to provide a control system for a hydrofoil boat which makes coordinated turns independent of whether the foil system is submerged or surface-piercing.

It is a further object of the invention to provide a system of lateral and directional trim for a hydrofoil boat.

A further object of the invention is to provide a hydrofoil boat having main hydrofoils which swivel to convert to skiis after striking submerged objects or solid ground, permitting safe deceleration.

A further object is to provide an energy efficient hydrofoil boat capable of quiet, comfortable, high speed operation coupled with high fuel economy.

A further object is to provide a hydrofoil boat that can be effortlessly and simply controlled from either left or right crew positions with equal ease.

Further objects of the invention are to provide a hydrofoil boat which is practical in terms of inexpensive modular, light-weight, non-corrosive construction; easy conversion to a self-trailering configuration; sealed components and simple design.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein.

DESCRIPTION OF THE PREFERRED EMBODIMENT

Figure 1:
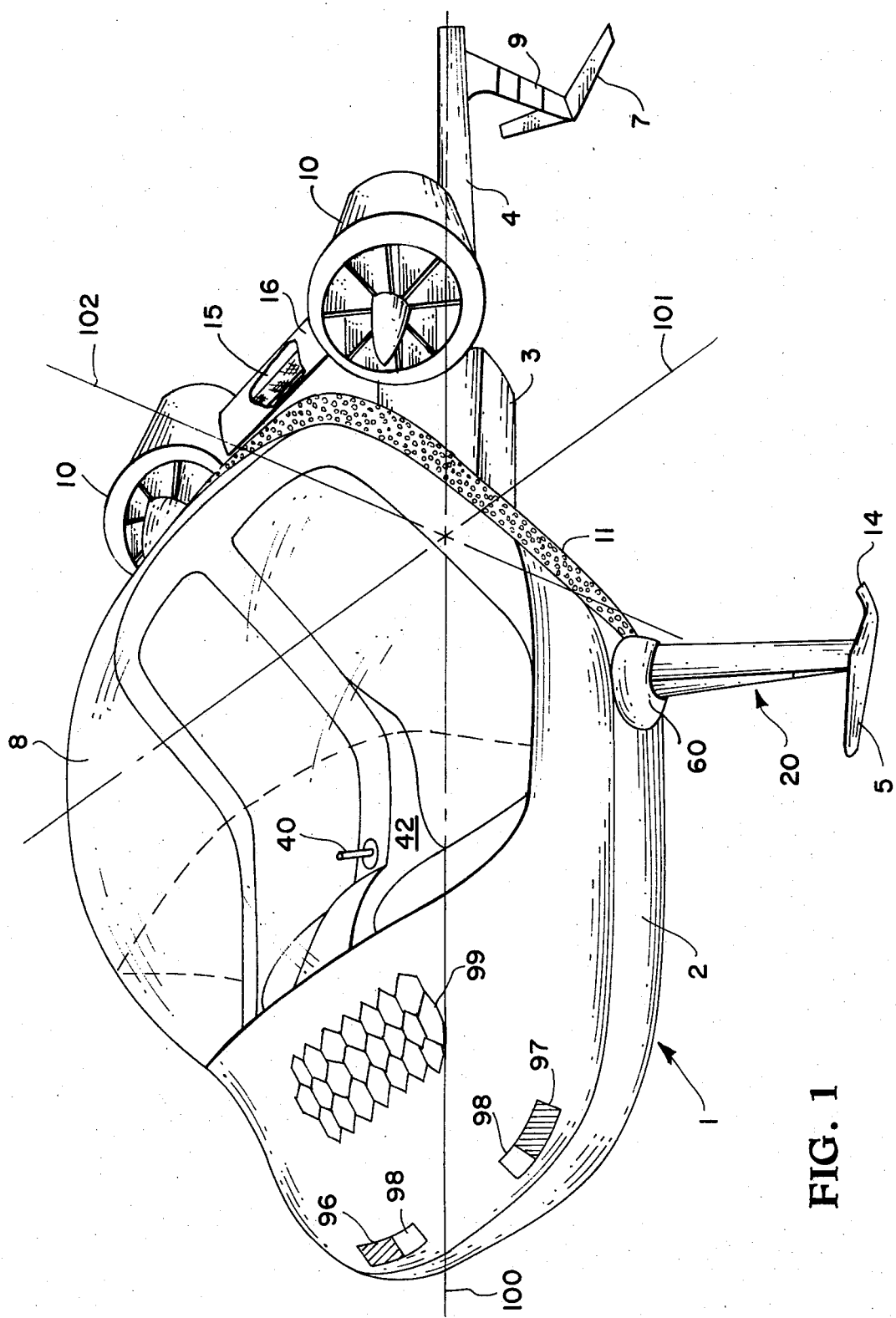
FIG. 1 is a perspective view of the preferred embodiment of the hydrofoil boat.

Referring now to the drawings wherein like numerals indentify like parts throughout the several views, and more particularly to FIG. 1, there is shown a hydrofoil boat 1 having a hull or crew module 2 which is seaworthy when the boat is not foil borne. A pair of forward main hydrofoils 5 are connected to hull 2 by an adjustable strut system 20. An engine module 3 is mounted on a tail boom 4 behind the crew module and a rear hydrofoil 7 is attached to tail boom 4 by strut 9. This vehicle has a longitudinal axis 100, lateral axis 101 and a vertical axis 102. The engine in engine module 3 drives two ducted fans 10 by means of a synchronous belt 15 completely contained within a housing 16. A perforated strip 11 across the top rear and sides of crew module 2 promotes the airflow through fans 10.

The point of connection of strut system 20 to hull 2 is covered by a fairing 60. Main foils 5 are curved upward at their outer ends 14 to allow them to convert to skiis as will be described later. Both main foils 5 and rear steering foil 7 which is connected to a strut 9 may be simultaneously positioned by control stick 40 on console 42 shown in the crew compartment.

A removable clear canopy 8 may be attached to completely (as shown) cover the crew. Alternatively, a windscreen configuration as shown by the portion of canopy 8 forward of the dotted line may be used to protect them from windblast. Operating lights are provided, green 96 and red 97 navigation lights and headlamps 98. An interchangeable red lens for light 96 enables lights 96 and 97 to be used as brake and directional signals in the self-trailering mode. Solar cell array 99 may be used to charge the vehicle battery when the engine is not operating.

Figure 2A:
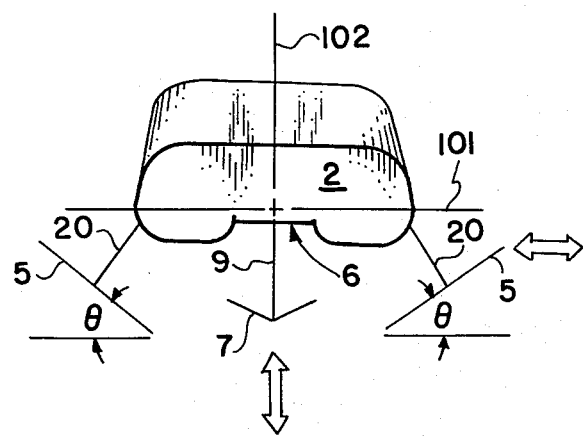
FIG. 2a is a front schematic view showing the positions of the tail foil and of the main hydrofoils for straight ahead cruise in calm water, no wind.
Figure 2B:
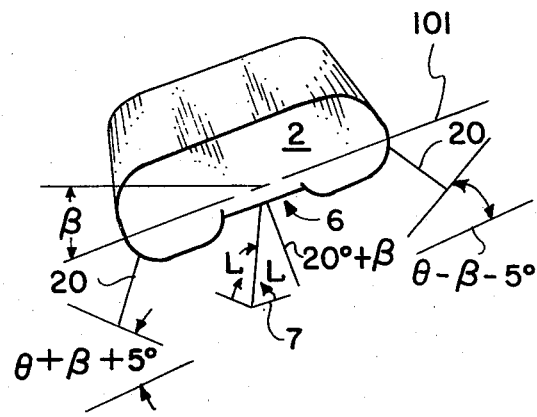
FIG. 2b is a front schematic view showing differential inclination of the two main hydrofoils and rotation of the rear strut and foil producing a starboard or right turn.

FIGS. 2a and 2b, while schematic views to be used in discussing manipulation of the main foils 5 and rear foil 7, also show a Ramus step and tunnel 6 beneath the hull 2 which aids in quicker transition from hull borne to foil borne operation at lower speeds. Foil angle of inclination $\theta$ and bank angle $\beta$ shown in FIGS. 2a and 2b are referenced to the lateral axis 101 of the vehicle. The angles depicted are representative only and not limiting.

Figure 3:
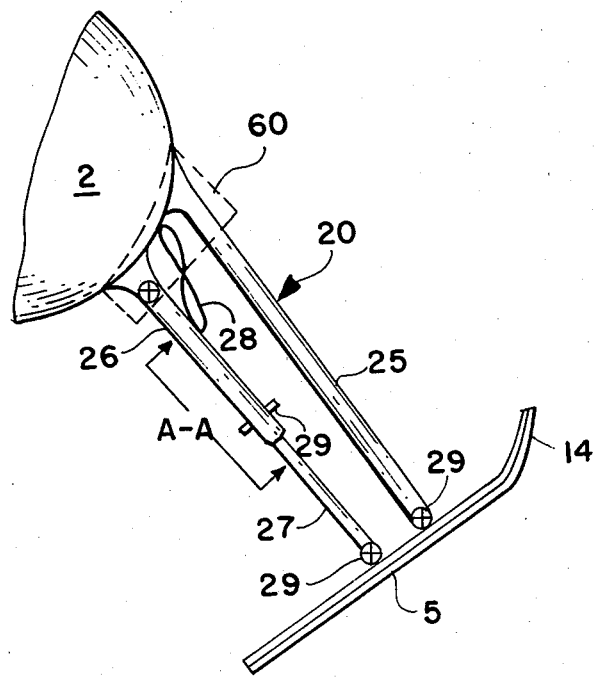
FIG. 3 is a detail view of the preferred embodiment of a main foil strut system.

FIG. 3 depicts the preferred embodiment of the adjustable strut system 20 wherein strut 25 is rigidly attached to hull 2 at its upper end and pivotally attached to main foil 5 at its lower end. Strut 27, pivotally attached to main foil 5, may be telescoped into strut 26 which is pivotally attached to the hull 2. A safety-type quick release pin 29 such as those manufactured by many United States fastener companies, may be used to fix the position of strut 27 to member 26 during trailering. The pivotal connections of struts 25 and 27 to main foils 5 may also use these safety-type quick release pins 29. The upward curvature of the outer ends 14 of main foils 5 is more clearly shown.

Figure 4:
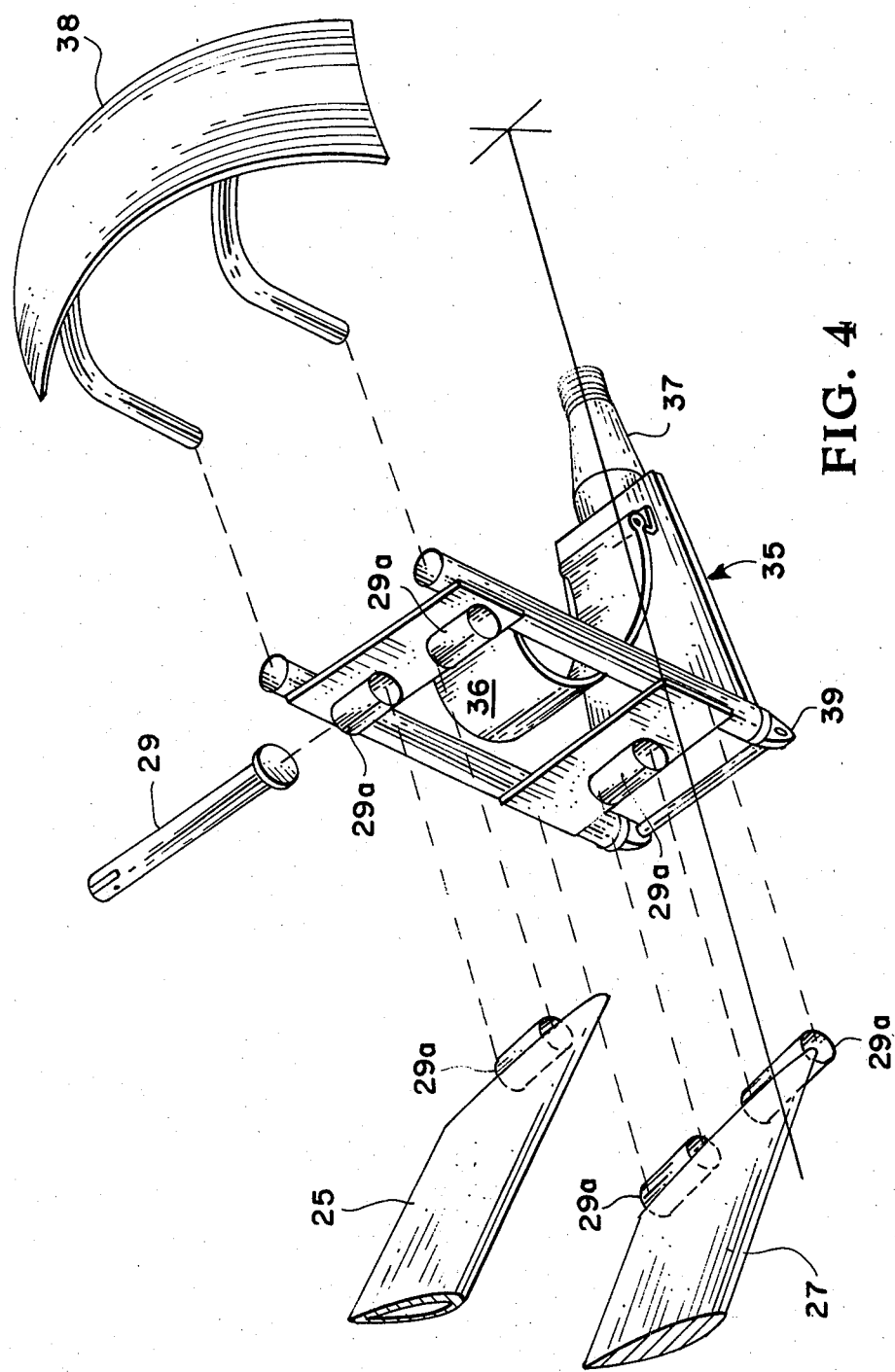
FIG. 4 is a perspective view of a wheel attachment fitting and fender which may be attached to the main strut system in lieu of the main foils.

FIG. 4 shows a detachable lightweight wheel attachment frame 35 and fender 38 which may be installed on the outboard ends of struts 25 and 27 by aligning quick release pin receivers 29a and inserting safety-type quick release pins 29, as shown in a front view in FIG. 3. Axle 37 is attached to frame 35 at hinge 39, parabolic spring 36 being used for shock absorption.

Figure 5:
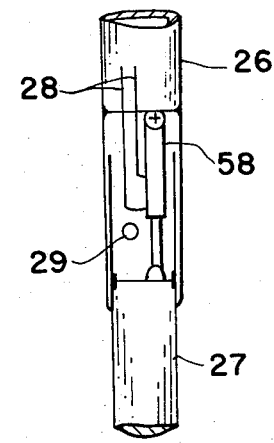
FIG. 5 is a detail view of section A—A of the strut in FIG. 3 showing the preferred means of extending and retracting this strut member.

FIG. 5, a cutaway section, A—A, of FIG. 3, illustrates a means of retracting member 27 into member 26. In this preferred method, a double action hydrostatic cylinder 58, operated by hydraulic lines 28 is used to retract strut 27 up into member 26. Cross sections of the streamlined strut members are shown. Quick release pin 29 may be inserted through both struts 26 and 27 to hold them rigid during trailering as also shown in FIG. 3.

Figure 6:
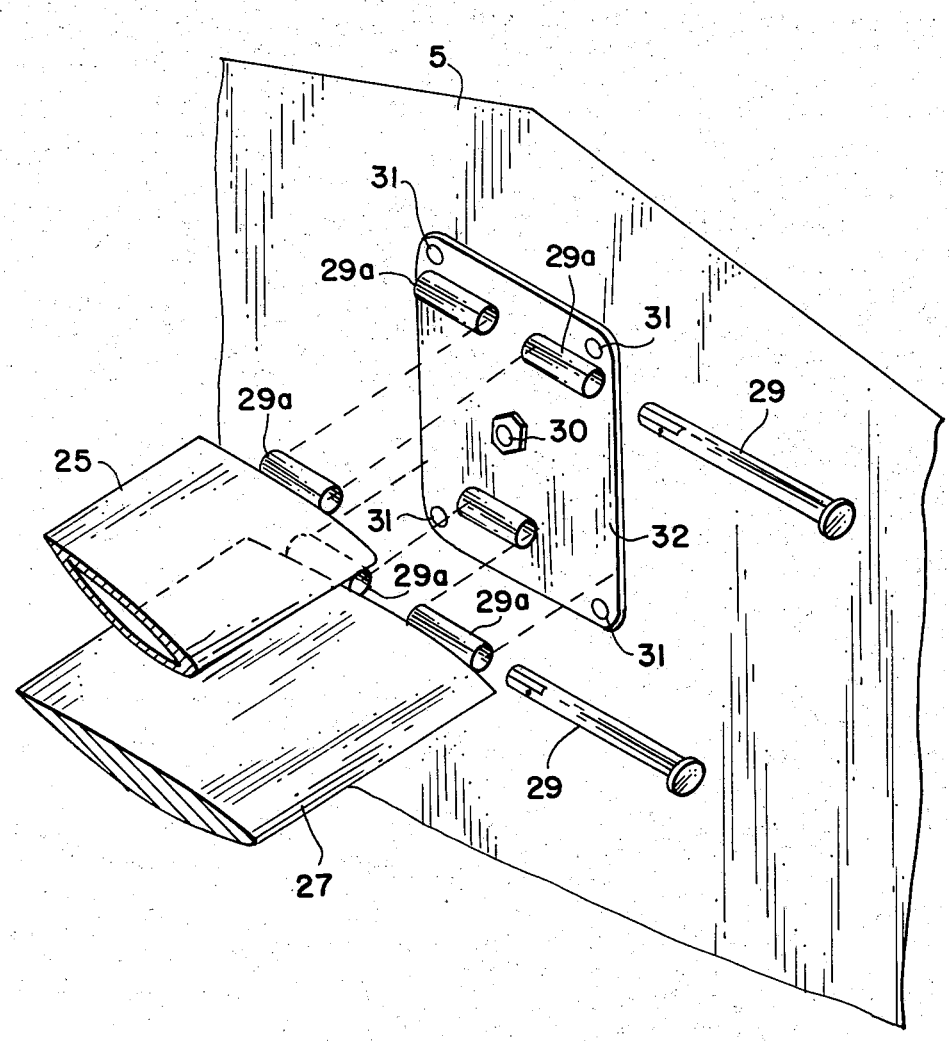
FIG. 6 is a perspective view, partly exploded, showing the means of attachment of the main struts to a main hydrofoil.

FIG. 6 shows attachment plate 32 rotatably attached to main foils 5 at central pivot 30. Plate 32 is prevented from rotating by shearing fasteners 31. Struts 25 and 27 are removably connected to attachment plate 32 by the alignment of quick release pin receivers 29a and the insertion of quick release pins 29 in the same fashion as the wheel attachment fitting shown in FIG. 4.

Figure 7:
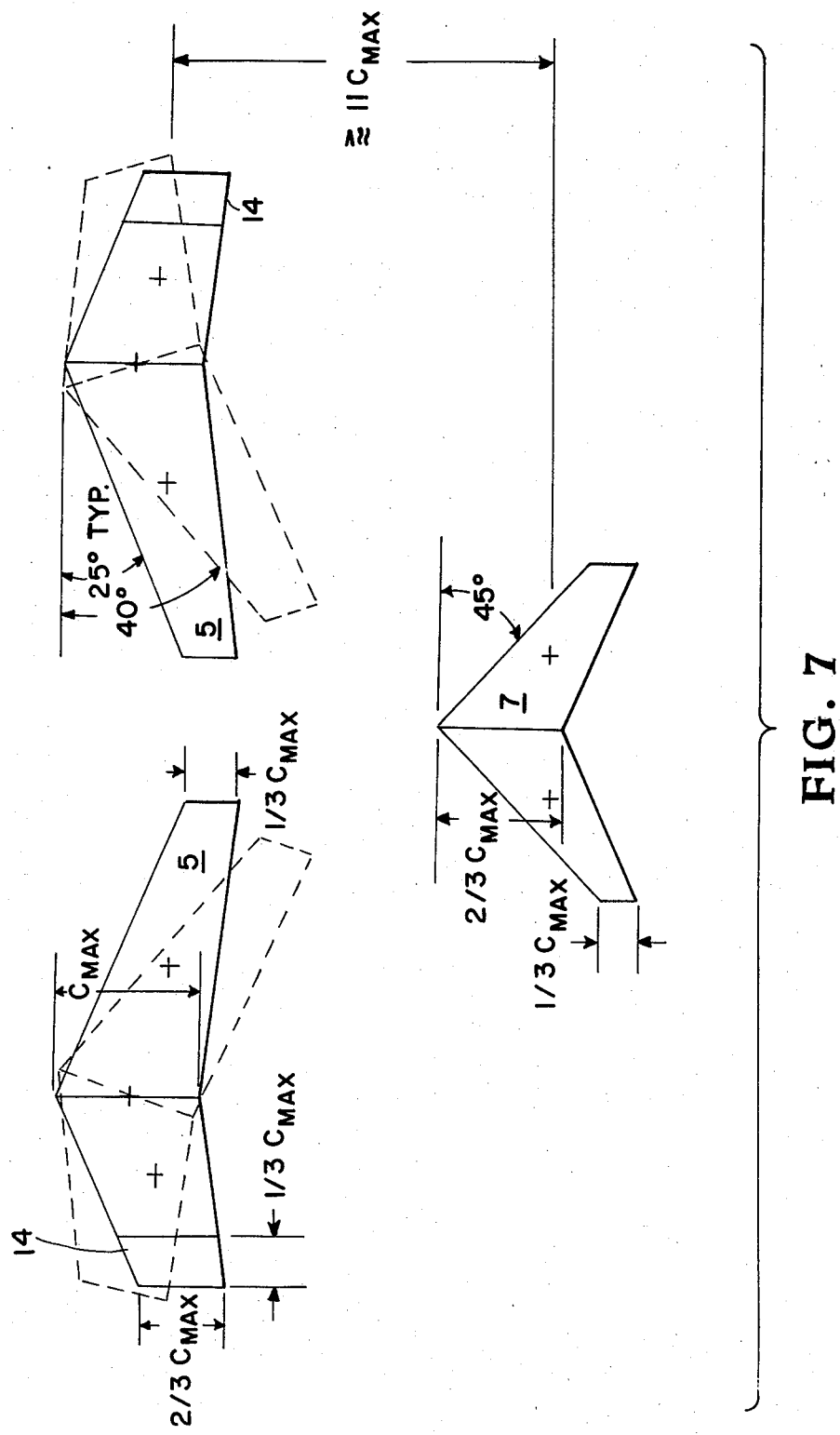
FIG. 7 is a fragmentary plan view showing only the hydrofoil configuration of the vehicle, schematically describing suggested relative sizing and longitudinal placement based upon the maximum chord of the main foils, and showing suggested normal and maximum foil sweepback angles for banking.

FIG. 7 depicts the three-point foil suspension system in schematic profile giving suggested dimensions of the main foils 5 and rear foil 7 and the maximum spacing of rear foil 7 from main foils 5 in terms of the maximum chord of the main foils, C MAX. The foil section selected for the preferred embodiment is NACA 65-010, although other subcavitating and supercavitating sections are suitable. The main foils vary from 6% c thickness at the C MAX or root position to 4% c at its tips. The angle of incidence of the main foils varies on the inboard sections from 3.25° at C MAX to 1.25° at the tip, with a constant 2.25° for the outboard sections. The outboard ends 14 of main foils 5 are deflected upward for reasons to be described later. Rear foil 7 varies in thickness ratio from 4% at the root to 3% at its tips and has an angle of incidence which varies from 0° in the vertical strut state to 1.25° in full turn or strut fully rotated state. All angular, linear and thickness ratio dimensions are merely suggested and are not critical to the invention.

Figure 8:
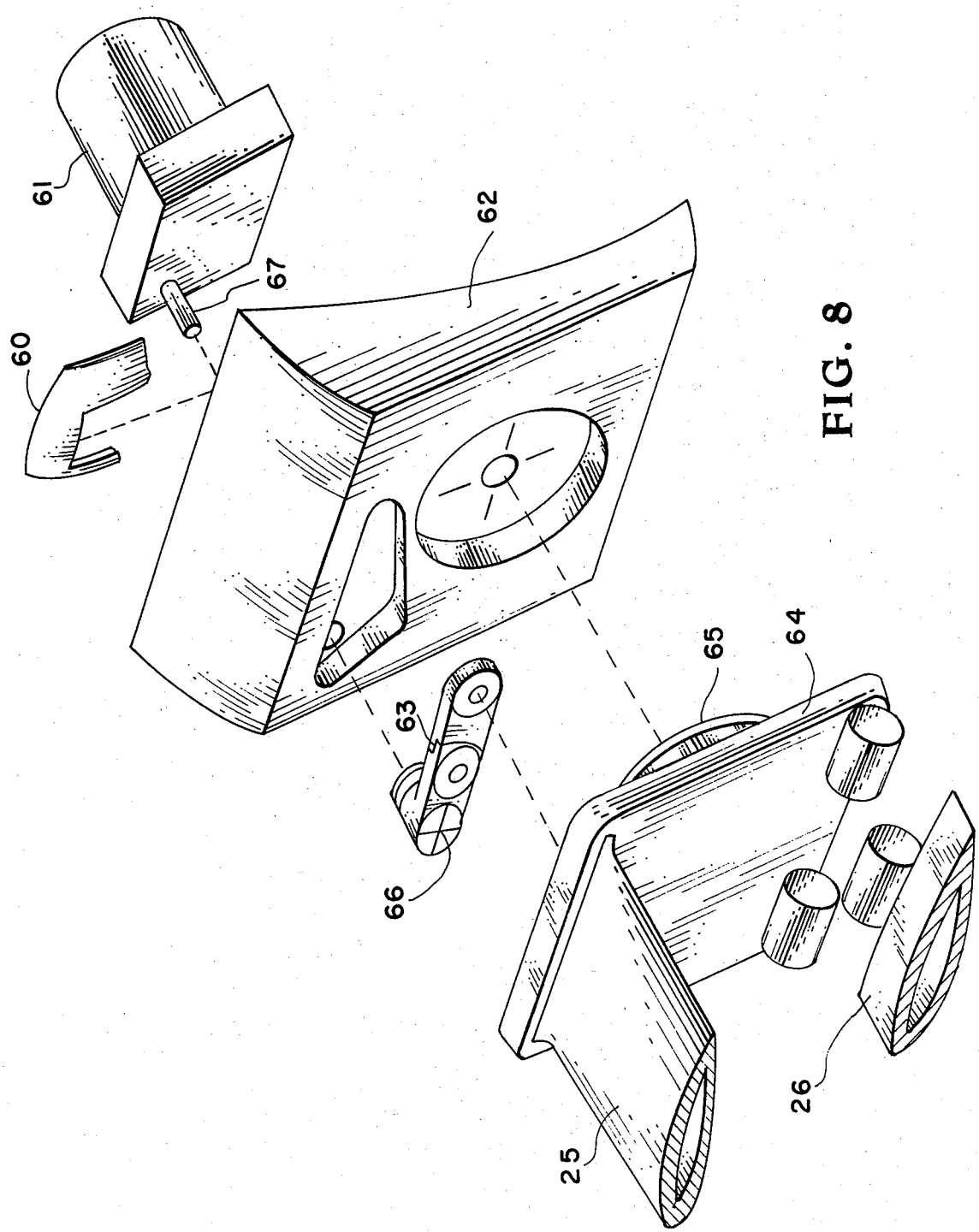
FIG. 8 is an exploded perspective view of a mechanism of a type suggested for use in increasing main foil sweepback angle by rotating the strut system. This view is of the port mechanism looking forward.

FIG. 8 shows the preferred embodiment of the mechanism used to vary (port) main foil sweepback angles as shown by dotted lines in FIG. 7. Top strut 25 and the pivotal attachment point for strut member 26 are connected at their upper ends to a deflection plate 64 which attaches to a bedplate 62 bonded to hull 2 (not shown). A servo gear motor 61, mounted within hull 2 and sealed, operates to rotate struts 25 and 26 through a toggle joint 63 attached to deflection plate 64. Output shaft 67 of servo gear motor 61 articulates toggle joint 63 about point of rotation 66.

Figure 9A:
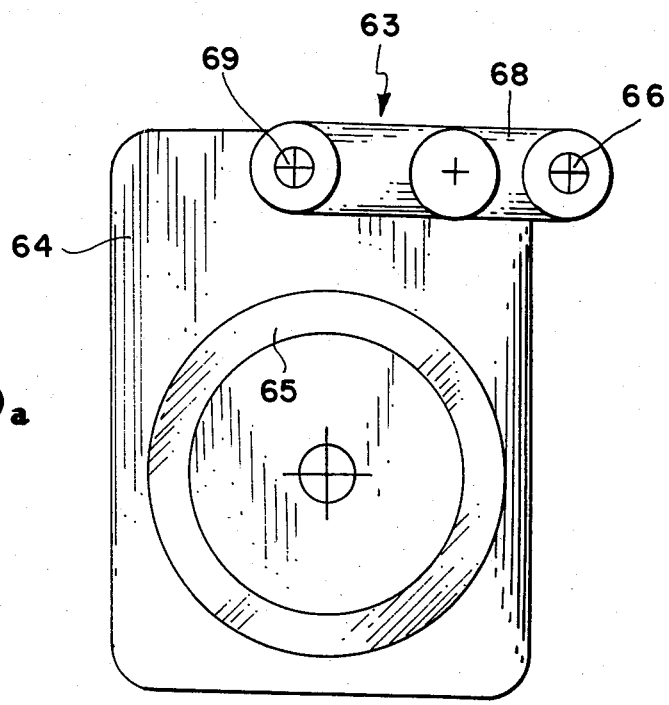
FIG. 9a is a plan view, looking outboard, of the deflection plate and toggle joint shown in FIG. 8 with the deflection plate shown in a position of zero deflection corresponding to normal sweep angle of the port main foil.
Figure 9B:
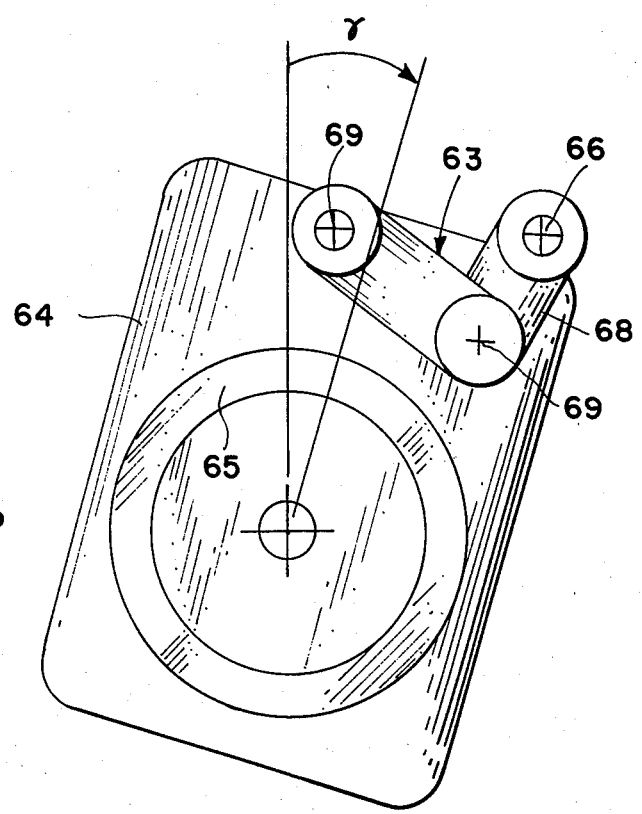
FIG. 9b is a plan view, looking outboard, of the deflection plate and toggle joint shown in FIG. 8 with the deflection plate shown in a position of maximum deflection corresponding to maximum sweep angle of the port main foil.

FIGS. 9a and 9b are planform views, looking outboard, of deflection plate 64 and toggle joint 63 shown in FIG. 8. Bearing surface 65 on deflection plate 64 contacts bedplate 62 shown in FIG. 8. Deflection plate 64 is shown in an undeflected position in FIG. 9a, corresponding to normal sweepback of the (port) main foil (not shown). In this position, toggle joint 63 and member 68 of said toggle joint are extended in a horizontal position. Distance between point of rotation 66, which connects to the output shaft of the servo gear motor as shown in FIG. 8, and swivel point 69, where deflection plate 64 is rotatably connected to toggle joint 63, is at a maximum.

In FIG. 9b, deflection plate 64 is shown at maximum deflection angle $\gamma$. This deflection has been caused by the counter clockwise rotation of member 68 about point of rotation 66. This rotation was induced by the rotating output shaft 67 of servo gear motor 61 shown in FIG. 8. In this articulated position of toggle joint 63, the distance between point of rotation 66 and swivel point 69 is at a minimum. When deflection plate 64 is deflected as shown in FIG. 9b, the (port) main foil (not shown) is at maximum sweep angle as shown by the dotted lines in FIG. 7.

Figure 10:
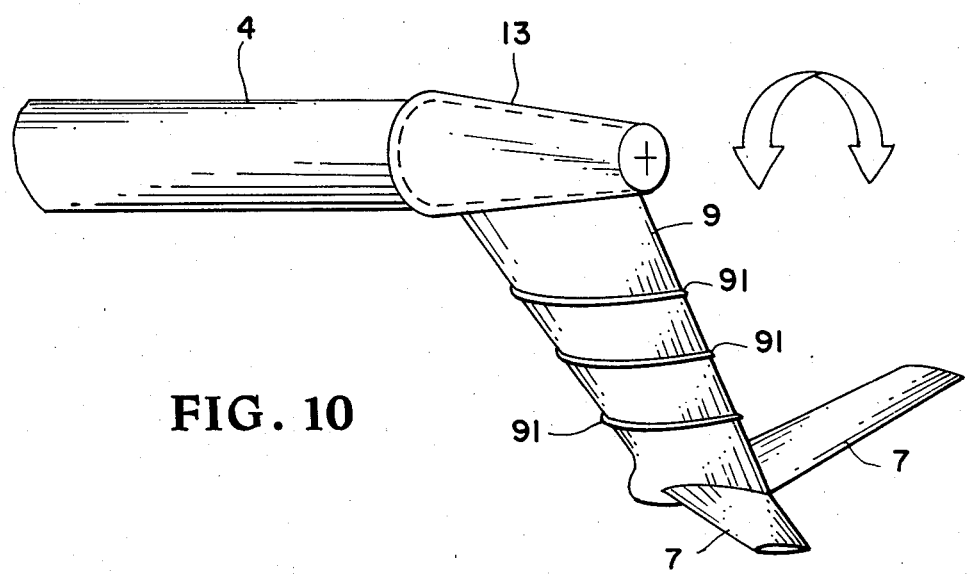
FIG. 10 is a rear perspective view of the rear foil, strut and rear portion of the tail boom of the vehicle.

FIG. 10 shows rear foil 7 and its supporting strut 9 attached to a rotating section 13 of tail boom 4. Strut 9 includes low pressure dams 91 to prevent air entrainment.

Figure 11:
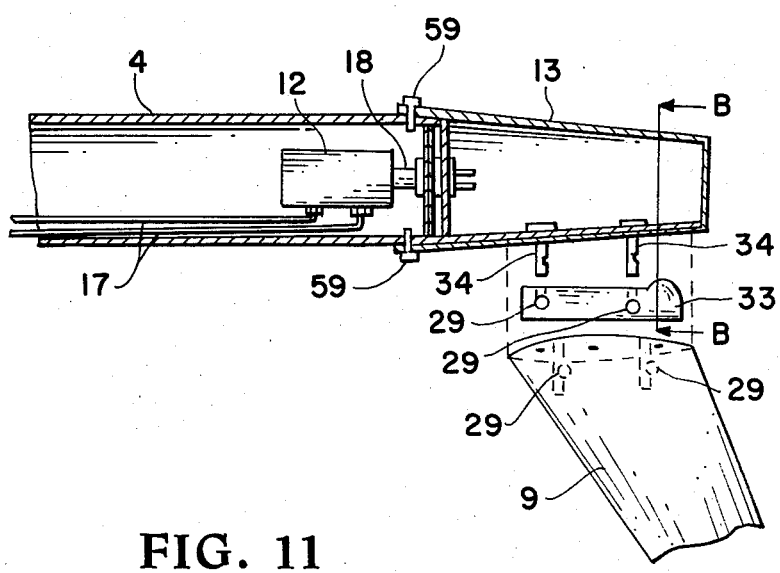
FIG. 11 is a cross-sectional side view of the rear foil and rear portion of the tail boom showing the means used to rotate the rear foil for steering. It is partly exploded to show alternative attachment of the rear strut and trailer hitch receptacle.

FIG. 11 shows the rear strut and tail boom in cutaway containing a double vane rotary actuator 12 with a split end shaft 18. Actuator 12 is hydraulically operated through lines 17 to rotate strut 9 and rear foil 7 selectively to starboard or port. For towing in the self-trailering mode (see FIG. 4) strut 9 may be removed and replaced by a trailer coupling 33. Pins 59 prevent rotation of rotating section 13 during towing. Metal pins 34 fastened securely inside tail boom 4 are notched to receive safety-type quick release pins 29 used to secure either strut 9 or coupling 33 as shown.

Figure 12:
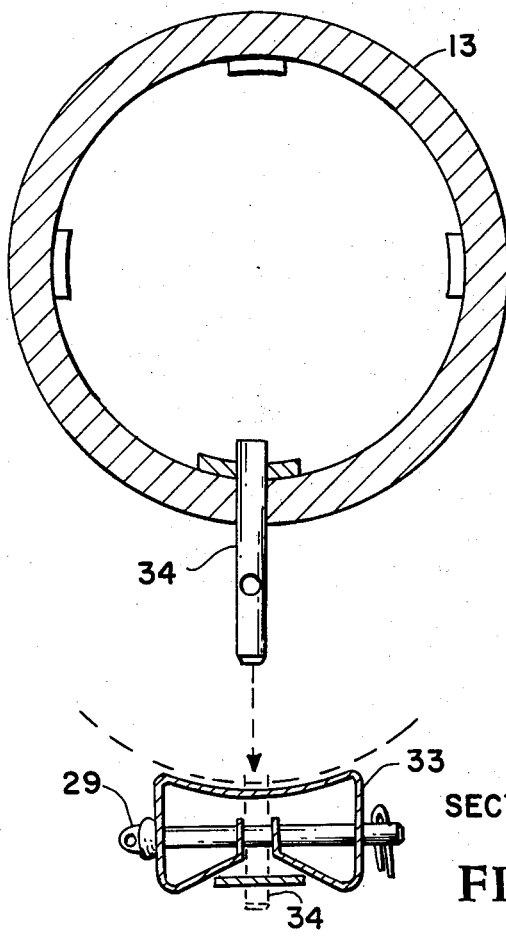
FIG. 12 is a detailed exploded view of section B—B of the tail boom and trailer hitch receptacle in FIG. 11 showing the method of attachment.

FIG. 12 is an exploded cross sectional end view of rotating section 13 and coupling 33 showing quick release pin 29 engaging the notched metal pin 34.

Figure 13:
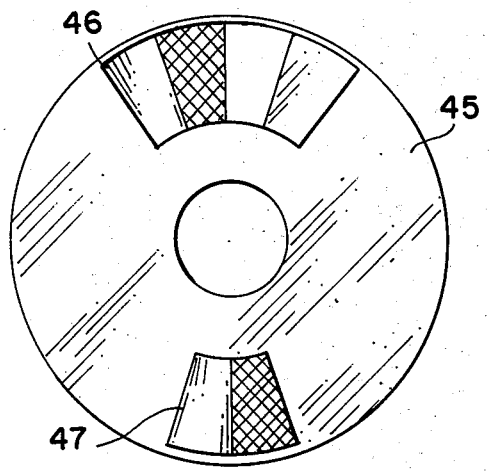
FIG. 13 is a plan view showing the cam contacts on the forward, stationary member used in the rotational steering system shown in FIG. 11.

FIG. 13 shows a forward stationary member 45 of the rotational steering system having concave 46 and convex 47 cam surfaces at top and bottom respectively. Member 45 is sized to fit within tail boom 4 and is fastened securely thereto.

Figure 14:
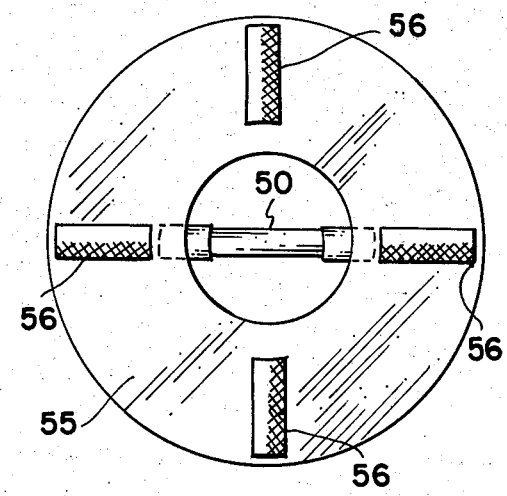
FIG. 14 is a plan view of the rotating member used in the rotational steering system shown in FIG. 11.

FIG. 14 shows a rear rotating member 55 of the steering system having cam followers or contacts 56 and a pinion 50.

Figure 15:
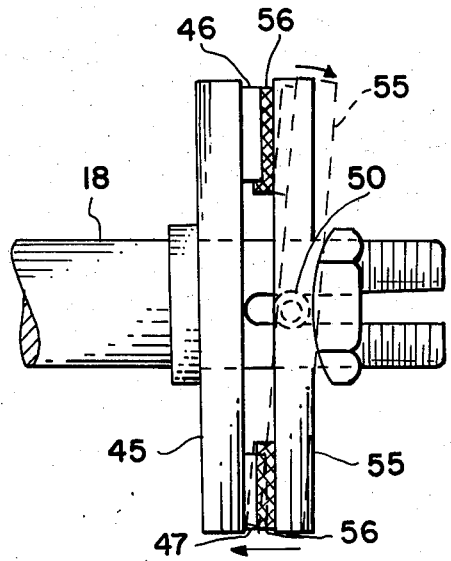
FIG. 15 is a side view of the stationary and rotating members of the steering system assembled on the actuator shaft and showing, by exaggeration, the deflection of the rotating member at full rotation.

FIG. 15 shows a partial assembly of the rotational steering mechanism with fixed member 45, rotating member 55 and shaft 18 from the actuator 12 shown in FIG. 11. Split shaft 18 passes through the hole in the center of member 45 without binding. The split end of shaft 18 engages pinion 50 so as to rotate member 55. Member 55 is also shown by dotted lines in a position caused by maximum rotation of actuator shaft 18 in which the cam surfaces have deflected member 55 and thus strut 9 and rear foil 7 at an angle to the vertical axis of the boat. This deflection angle has been exaggerated in this view, a suggested value being about $1\frac{1}{2}°$.

Figure 16:
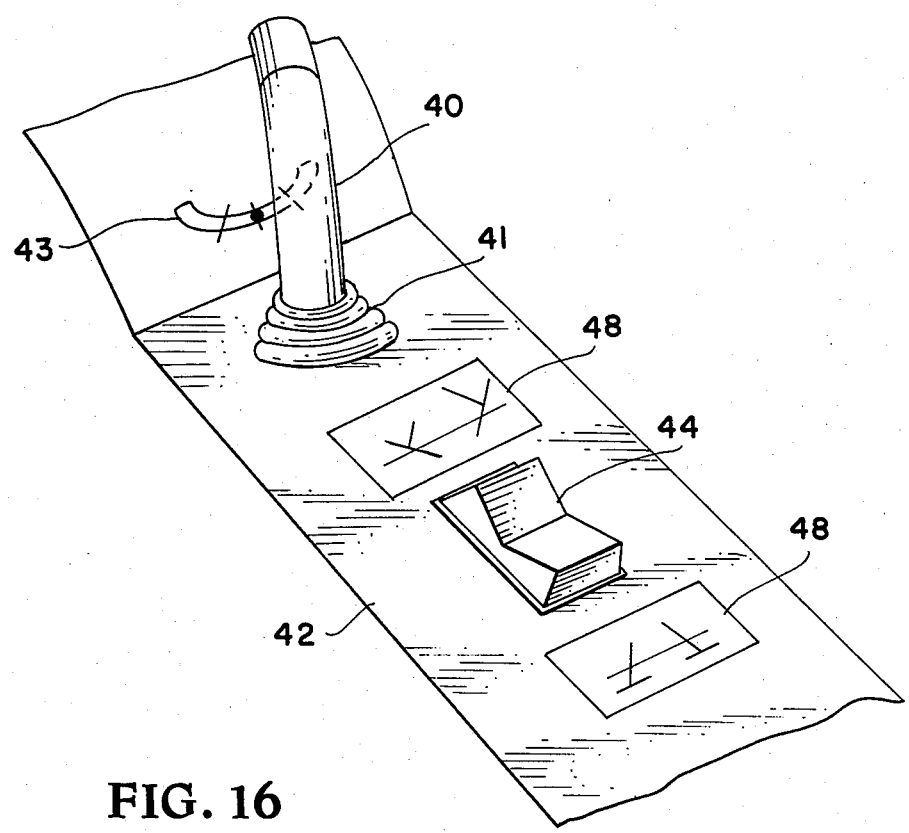
FIG. 16 is partial rear elevational view of the center console of the crew compartment of the boat showing the control stick, simultaneous foil angle control and turn and slip indicator.

FIG. 16 depicts the arrangement of sidearm, joy stick-type steering control 40 covered at its base by a flexible boot 41. Also mounted on center console 42 are a skid and slip indicator 43 and rocker-type switch 44 for controlling simultaneous angular deflection of main foils 5. Mounted on the console beside switch 44 are graphic decals 48 showing intended results in main foil deflection due to different switch actuations.

Figure 17:
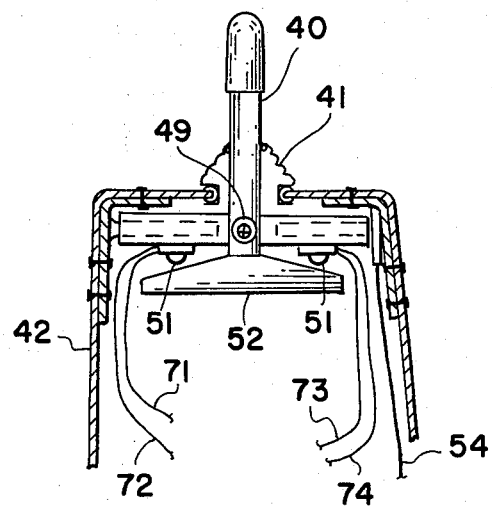
FIG. 17 is a cutaway schematic view of the control stick and surrounding area.

FIG. 17 is a cutaway schematic diagram for the sidearm steering control. Control stick 40 is mounted on the gimbal 49 to actuate throttle control 54 when rotated fore and aft. Stick 40 is also connected at its bottom end to a rocker plate 52. Pressure sensitive or rheostatic switches 51 are actuated by rocker plate 52 in proportion to the side force applied to stick 40 and these switches relay a correspondingly proportional signal through wires 71, 72, 73 and 74 to operate actuator 12 (FIG. 11) and hydrostatic cylinder 58 (FIG. 5) as to be described.

Figure 18:
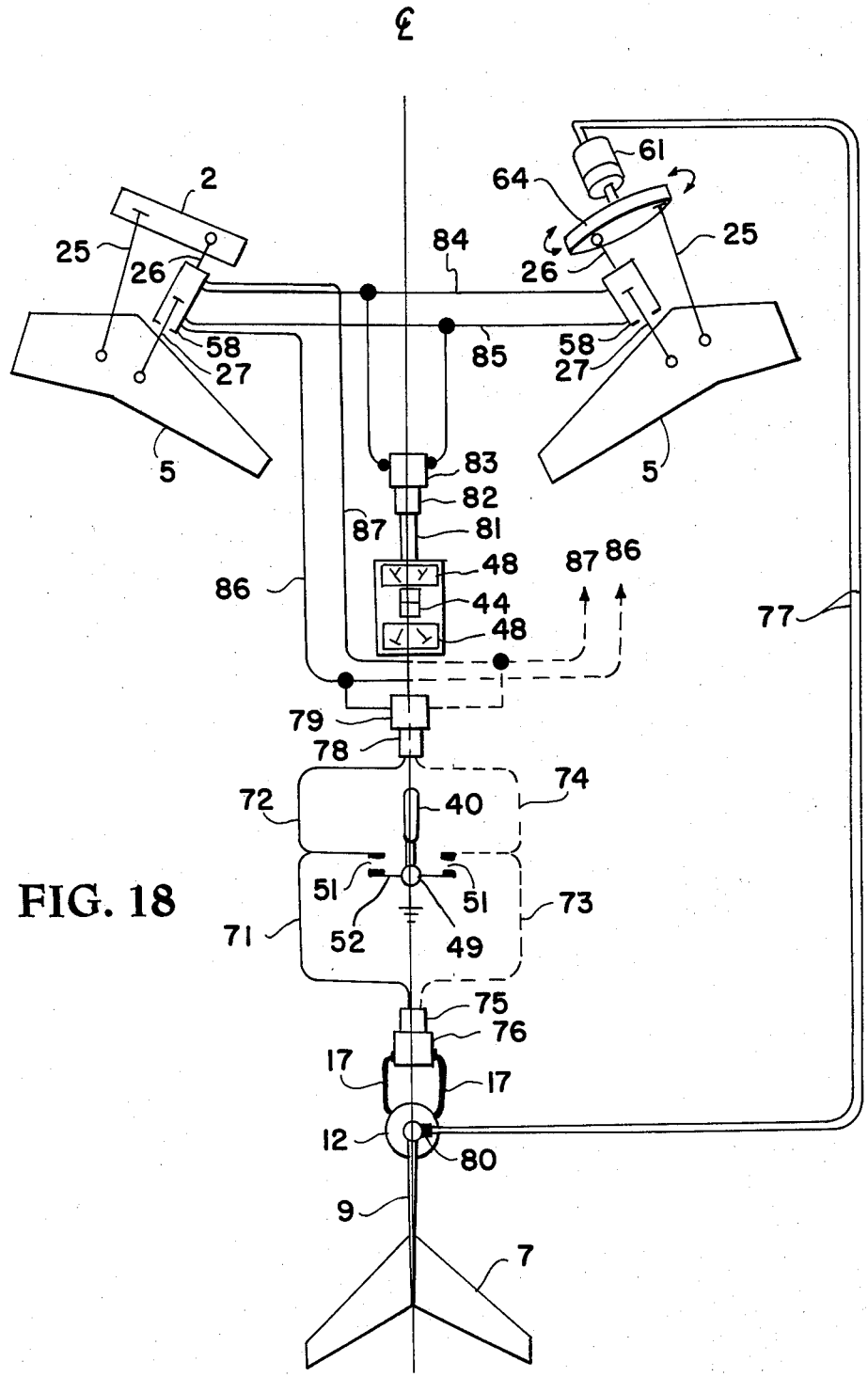
FIG. 18 is a schematic view of a control system for simultaneous and proportional actuation of main and steering foils to produce coordinated turns. The left half of the schematic and the dotted lines on the right half show a control system for an embodiment utilizing differential main foil inclination angle for bank control while the right half of the schematic shows a control system for an embodiment using differential main foil sweep angle for bank control.

FIG. 18 is a combined control schematic, the left half showing a control system for banking the craft using differential angles of main foil inclination and the right half showing a control system for banking the craft using differential angles of main foil sweepback. Rocker control switch 44 having graphic decals 48 operates an electric motor 82 and a hydraulic pump, with reservoir, 83 through electric wires 81. Pump 83 is connected to the up sides and to the down sides of double-acting hydraulic cylinders 58 by lines 85 and 84 respectively. Struts 25, 26 and 27 are shown schematically connected to main foils 5 and to hull 2 (left half of FIG. 18) or to deflection plate 64 (right half of FIG. 18).

Control stick 40 is shown with the same components shown in more detail in FIG. 17. Control stick 40 is gimballed about point 49 and may be used to operate electric motor 75 and a hydraulic pump, with reservoir, 76 through electric wires 71 and 73 when rocker plate 52 engages switches 51. Pump 76 pressurizes rotary actuator 12 through lines 17 to rotate rear strut 9 and rear foil 7.

Referring to the left half of FIG. 18, bank may be produced when sideward motion of stick 40 activates electric motor 78 and hydraulic pump, with reservoir, 79 through electric wires 72 and 74. Pump 79 is connected to the up side of the port double-acting hydraulic cylinder 58 and to the down side of the starboard cylinder 58 (connection not shown) by line 86. Line 87 connects pump 79 to the down side of port cylinder 58 and the up side of starboard cylinder 58 (connection not shown). Dotted lines illustrate starboard side plumbing and wiring.

Referring to the right half of FIG. 18, bank may be produced when sideward motion of control stick 40 rotates servo gear motor 12. A position transducer 80 detects this rotation and actuates servo gear motor 61 through electric wires 77 to deflect deflection plate 64 and change the sweep angle of main foil 5 through strut system 25, 26 and 27.

Figure 19:
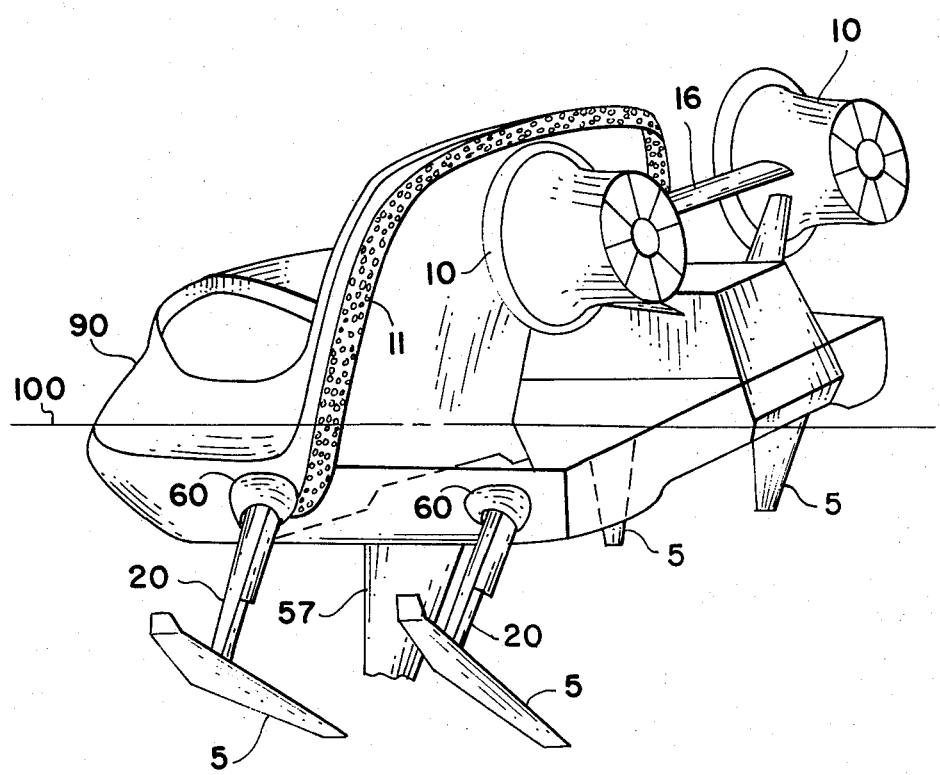
FIG. 19 is a rear perspective view of an alternate embodiment of the invention.

FIG. 19 depicts an alternate embodiment of the invention 90 having four main hydrofoils 5 in two pairs on starboard and port sides of the longitudinal axis 100 of the boat. In this embodiment, a dagger board type rudder 57, which can be retracted rearward into the boat, can be used to produce yawing moment for turning in concert with the same alternative movement of the main foils as described above. For banking, as previously described, the main foils on each side of axis 100 are operated together to produce differential angles of inclination or, alternatively, sweepback angles between the starboard and the port main foils.

Lightweight, non-corrosive high strength materials are preferred for construction of the subject boat. In addition to filling cavities like the tail boom with plastic foam for floatation, the modular hull, engine compartment, fan ducts and engine compartment can be made of polycarbonate reinforced plastic, for example. Members such as the foils could be made in layers with an inner duraluminum base bonded to kevlar or comparable reinforced plastic and covered with teflon or vinyl bonded sheath. Struts and tail boom may be annodized aluminum alloy. Steel parts such as the wheel attachment spring 36 (FIG. 4) are vinyl clad and many parts can be made of high strength nylon or composites. Modular construction and simple components should permit servicing and maintenance by those currently involved in boat maintenance without additional training or skills.

OPERATION

The operation of the present invention is now believed to be apparent. Changing the angle of inclination $\theta$ of both main foils 5 in concert, see FIG. 2a, enables the boat to operate with these foils submerged or piercing the surface of the water. Submerged foil operation allows the boat to become foil borne at lower speeds and can lift the boat higher in rough seas. It may also be selected in shallow water. Surface-piercing foil operation provides more stability and better handling at higher speeds and when maneuvering and allows higher top speed by eliminating foil-strut interference drag. A separate control 44, shown in FIG. 16 is used to select various angles of $\theta$ from about 0° to 45° in infinitely variable increments.

Yawing force and bank for coordinated turns are produced by a single sideward movement of control stick 40, shown in FIG. 16. This sideward movement operates actuator 12, shown in FIG. 11 and FIG. 18, producing an amount of starboard or port rotational deflection of strut 9 and rear foil 7 proportional to the amount of sideward movement of the stick. FIG. 2b shows the lift forces acting on the two wing surfaces of rear foil 7 in a full deflection right or starboard turn where the angle of rotation of strut 9 equals the dihedral angle of rear foil 7 plus the bank angle of the boat $\beta$. As shown in FIG. 2b the lift force L on one wing of foil 7 is vertical while the other is inclined to the vertical, producing a sideward force at the rear of the vehicle or a yawing force for turning. Despite the rotation of rear foil 7 to this maximum turn position, the total vertical lift produced by foil 7 remains the same, but there is a need for more lift in turn due to centrifugal force or g loading. Accordingly, the cam action of the rotational steering system shown by the dotted lines in FIG. 15 causes an increase in the angle of incidence of rear foil 7 as it is rotated by actuator 12 from a strut vertical or zero side force position.

The sideward motion of control stick 40 also causes the boat to bank in one of two alternative ways. This sideward movement of control stick 40 can be used to produce a differential between the angles of inclination of main foils 5 as shown in FIG. 2b, this angular difference being proportional both to the amount of sideward movement of control stick 40 and to the amount of rotation of rear strut 9 and rear foil 7 being simultaneously produced. Although the actual proportion between rear foil rotation in degrees and differential inclination of the main foils in degrees would depend upon numerous factors, illustrative full turn values of 20°+$\beta$ rotation of rear foil 7, where $\beta$ is the bank angle of the boat, and a 2 $\beta$ plus ten degree differential in the angles of inclination of main foils 5 (an increase of the boat bank angle plus five degrees for the starboard foil and a decrease of the boat bank angle plus five degrees for the port foil) are shown in FIG. 2b.

Alternatively, sideward motion of control stick 40 may be used to cause the boat to bank through the actuation of one of the servo gear motors 61, quickly increasing the sweepback angle of one of the main foils 5 as shown in FIG. 7. Servo gear motors 61 are actuated by position transducers 80 on the double vane rotary actuator to produce a change in main foil sweep angle which is proportional to the rotation of rear strut 9 and rear foil 7 (see FIG. 18, control schematic). The increase in sweepback angle would therefore be proportional to both the amount of sideward movement of control stick 40 and to the amount of angular rotation of strut 9 and rear foil 7. Although the actual proportion in sweep angle change to rear foil rotation would depend on many factors, for purposes of illustration, a rear foil 7 rotation angle of 20°+β, as before, and an increase in sweepback angle on one foil of 15° could be used to produce a full turn in the direction of the foil with increased sweepback angle.

Should a main foil 5 strike a submerged object or solid ground, shearing fasteners 31, shown in FIG. 6, would fail allowing the foil to swivel and streamline in the water with the outer, curved end 14 of the strut 5 projecting forward in a water ski configuration. This safety feature should allow the boat to be slowed to hull borne operating speeds without loss of control.

The boat may be used as its own trailer by removing foils 5 and rear strut 9 and replacing them with wheel attachments 35 shown in FIG. 4 and trailer coupling 33 as shown in FIG. 11 and FIG. 12. Pins 29 as shown in FIG. 3 and FIG. 5 and pins 59 as shown in FIG. 11 are used to make struts 26 and 27 and tail boom parts 4 and 13 rigid during towing.

Control stick 40 may be fitted with a movable handgrip providing motorcycle type throttle control or, being gimballed, can be used as an aircraft throttle with forward and aft movement to control engine r.p.m.

Referring now to control schematic FIG. 18, rocker switch 44 changes the angles of inclination of main foils 5 simultaneously with fore and aft rocking movements. Since the surface-piercing mode is the more efficient at higher speeds, a forward rocking movement increases inclination angles while an aft movement decreases said angles.

Electric motor 82 actuated by switch 44 through electric wires 81 operates hydraulic pump, with reservoir 83, to pressurize line 84 or line 85. Pressurizing line 84 increases the angle of inclination of both main foils 5 while pressurizing line 85 decreases the angle of inclination of main foils 5.

Sideward movement of control stick 40 sends electrical current through switches 51 and wires 71 and 73 to operate electric motor 75 and hydraulic pump, with reservoir 76. Hydraulic pump 76 selectively rotates strut 9 and rear foil 7 to starboard or port through rotary actuator 12 by pressurizing lines 17. This produces yawing force as previously described.

Bank is produced by differentially inclining the two main foils 5, shown schematically in FIG. 18 by port main foil 5, or by differentially sweeping the two main foils 5, as shown schematically in FIG. 18 by starboard main foil 5. For differential inclination, the same sideward movement of stick 40 that produces rear strut and rear foil rotation and yawing force also actuates electric motor 78 through wires 72 and 74. Motor 78 causes hydraulic pump, with reservoir, 79 to pressurize the up side of the port double-acting hydraulic cylinder 58 and the down side of the starboard double-acting hydraulic cylinder 58, or vice versa, to produce differential angles of inclination between starboard and port main foils 5 in proportion to the yawing force produced by the simultaneous rotation of rear strut 9 and rear foil 7.

To bank the craft by creating differential sweepback angle between the main foils 5, rotation of rear strut 9 and rear foil 7 by sideward movement of control stick 40, as described previously, actuates position transducer 80. Position transducer 80, in turn, actuates electric servo gear motor 61 through electric wires 77 to rotate deflection plate 64 and change (increase) the sweep angle of the affected strut system and main foil as previously described. Transducer 80 controls the amount of sweep angle change in an amount proportional to the yawing force being produced to effect coordinated turns.

FIG. 19, through depiction of an alternate embodiment of the invention, distinguishes between some of the novel features of the invention and merely associated structure. Main foils 5 function in exactly the same fashion as described above. Coordinated turns may be produced with yawing force supplied by a somewhat conventional dagger board type rudder 57, for example, and bank angle supplied by increasing the sweep of the starboard or port side foils or, alternatively, by differentially inclining the starboard side foils vis a vis the port side foils. The same control inputs may be used to produce coordinated turns, the yawing force being in proportion to bank angle produced. The control system schematic would vary only in the numbers of hydrostatic cylinders 58 or the numbers of rotary actuators 61 required to manipulate the additional pair of main foils 5.

In FIG. 1, a perforated laminator strip 11 is provided around the rear of the crew compartment 2 to improve airflow to the ducted fans 10 which are shown compactly mounted near engine 3 to shorten the path of belt drive 15, to keep the thrust line low, and to keep vehicle width to a minimum. Of course, the fans might be mounted further apart and/or higher or the crew compartment might be made with tandem rather than side by side seating.

The rotating breakaway feature shown in FIG. 6 could be adapted to the connection between the strut system 20 and the boat—under fairing 60 shown in FIG. 1. The main foils could still be free to swivel and streamline if plate 32, pivot 30 and shearing pins or bolts 31 were used to connect strut system 20 to the side of the hull or other structure rather than connecting foils to struts as shown.

In lieu of the sidearm joystick control shown in FIG. 16 and FIG. 17, a steering wheel, foot pedals or any right-left control would be feasible. Although the actuators for rotating rear strut 9 and inclining main foils 5 are hydraulic and the actuators for increasing the sweepback angle of foils 5 are electric as shown, they could be any combination of hydraulic, electrical, or even manual with some sacrifice in compactness and simplicity of operation. The location and function of the methods of actuation shown are merely illustrative and not to be taken as limiting.

Obviously, numerous modifications and variations of the present invention are possible in the light of the above teachings. It is, therefore, to be understood that within the scope of the appended claims, the invention may be practiced otherwise than as specifically described therein.

What is claimed as new and desired to be secured by Letters Patent of the United States is:

1. An improved hydrofoil boat comprising: a hull and propulsive means attached thereto; hydrofoil means connected to said hull for hydrodynamically supporting the boat; means connected to said hull and connected to said hydrofoil means at an intersection for moving said hydrofoil means from a position approximately parallel to the lateral axis of the boat to positions of increasing angles of inclination and said means for moving also being for alternatively permitting operation of said hydrofoil means in a submerged configuration wherein said hydrofoil means together with said intersection are completely submerged, and in a surface piercing configuration wherein said hydrofoil means are partially submerged and said intersection is above water; and means for steering the boat through the water.

2. The boat of claim 1 wherein said means for moving includes adjustable strut means for connecting said hydrofoil means to said hull and further includes means for adjusting said strut means to change said angles of inclination of said hydrofoil means to include said submerged configuration, wherein said hydrofoil means and a portion of said strut means are submerged, and said surface piercing configuration, wherein said strut means and a portion of said hydrofoil means are above the surface of the water when foil borne.

3. The boat of claim 2 including a first control means connected to said strut means and controlling said means for adjusting said strut means to change said angles of inclination of said hydrofoil means in concert.

4. The boat of claim 1 wherein said means for steering includes: means connected to said hull for yawing the boat about its vertical axis; means connected to said hull for banking the boat about its longitudinal axis; and a second control means for simultaneously and proportionately activating said banking means and said yawing means to produce coordinated turns by the boat with a single movement, said control means being connected to said hull, said banking means and to said yawing means.

5. The boat of claim 4 wherein the outer ends of said hydrofoil means are inclined upward and the connection between said hydrofoil means and said hull includes means for rotatably releasing and for allowing said hydrofoil means to streamline and become approximately parallel to the longitudinal axis of the boat with said outer ends of said hydrofoil means pointing in a forward and upward direction in a water ski configuration in response to an impact force against said hydrofoil means.

6. The boat of claim 4 wherein said means for banking includes: means connected to said hydrofoil means and to said second control means for inducing differential angles of inclination between said hydrofoil means on the port side of the boat and said hydrofoil means on the starboard side of the boat.

7. The boat of claim 6 wherein the outer ends of said hydrofoil means are inclined upward and the connection between said hydrofoil means and said hull includes means for rotatably releasing and allowing said hydrofoil means to streamline and become approximately parallel to the longitudinal axis of the boat with said outer ends of said hydrofoil means pointing in a forward and upward direction in a water ski configuration in response to an impact force against said hydrofoil means.

8. The boat of claim 6 wherein said means for yawing includes a submerged hydrofoil wing having positive dihedral and being connected at approximately mid span to a vertical strut, said vertical strut being rotatably attached to said hull and rotating to starboard and to port from the vertical.

9. The boat of claim 8 wherein said vertical strut includes a means for fore and aft rotation of said submerged hydrofoil wing, forward rotation occurring when said vertical strut is rotated to starboard and to port from the vertical and aft rotation occurring when said vertical strut is rotated toward the vertical from starboard and port.

10. The boat of claim 6 wherein said means for moving includes adjustable strut means for connecting said hydrofoil means to said hull and further includes means for adjusting said strut means to change said angles of inclination of said hydrofoil means to include said submerged configuration wherein said hydrofoil means and a portion of said strut means are submerged and said surface piercing configuration wherein said strut means and a portion of said hydrofoil means are above the surface of the water when foil borne, and further including a first control means connected to said strut means and controlling said means for adjusting said strut means to change said angles of inclination of said hydrofoil means in concert.

11. The boat of claim 10 wherein said means for yawing includes a submerged hydrofoil wing having positive dihedral and being connected at approximately mid span to a vertical strut, said vertical strut being rotatably attached to said hull and rotating to starboard and to port from the vertical.

12. The boat of claim 10 wherein the outer ends of said hydrofoil means are inclined upward and the connection between said hydrofoil means and said hull includes means for rotatably releasing and allowing said hydrofoil means to streamline and become approximately parallel to the longitudinal axis of the boat with said outer ends of said hydrofoil means pointing in a forward and upward direction in a water ski configuration in response to an impact force against said hydrofoil means; wherein said hydrofoil means may be detached from said strut means and replaced with wheel attachments; said vertical strut may be detached from said hull and replaced with a trailer coupling; and further including means for preventing the starboard and port rotation of said trailer coupling and means for preventing the extension and compression of said strut means whereby the boat converts to a trailer which may be towed conventionally by an automobile.

13. The boat of claim 4 wherein said means for banking includes means attached to said hydrofoil means and to said hull for selectively creating a differential between the sweepback angle of said hydrofoil means on the port side of the boat and the sweepback angle of said hydrofoil means on the starboard side of the boat.

14. The boat of claim 13 wherein the outer ends of said hydrofoil means are inclined upward and the connection between said hydrofoil means and said hull includes means for rotatably releasing and allowing said hydrofoil means to streamline and become approximately parallel to the longitudinal axis of the boat with said outer ends of said hydrofoil means pointing in a forward and upward direction in a water ski configuration in response to an impact force against said hydrofoil means.

15. The boat of claim 13 wherein said means for yawing includes a submerged hydrofoil wing having positive dihedral and being connected at approximately mid span to a vertical strut, said vertical strut being rotatably attached to said hull and rotating to starboard and to port from the vertical.

16. The boat of claim 13 wherein said means for moving includes adjustable strut means for connecting said hydrofoil means to said hull and further includes means for adjusting said strut means to change said angles of inclination of said hydrofoil means to include said submerged configuration wherein said hydrofoil means and a portion of said strut means are submerged and said surface piercing configuration wherein said strut means and a portion of said hydrofoil means are above the surface of the water when foil borne and including a first control means connected to said strut means and controlling said means for adjusting said strut means to change said angles of inclination of said hydrofoil means in concert.

17. The boat of claim 16 wherein the outer ends of said hydrofoil means are inclined upward and the connection between said hydrofoil means and said hull includes means for rotatably releasing and allowing said hydrofoil means to streamline and become approximately parallel to the longitudinal axis of the boat with said outer ends of said hydrofoil means pointing in a forward and upward direction in a water ski configuration in response to an impact force against said hydrofoil means; wherein said hydrofoil means may be detached from said strut means and replaced with wheel attachments; said vertical strut may be detached from said hull and replaced with a trailer coupling; and further including means for preventing the starboard and port rotation of said trailer coupling and means for preventing the extension and compression of said strut means whereby the boat converts to a trailer which may be towed conventionally by an automobile.

18. The boat of claim 16 wherein said means for yawing includes a submerged hydrofoil wing having positive dihedral and being connected at approximately mid span to a vertical strut, said vertical strut being rotatably attached to said hull and rotating to starboard and to port from the vertical.

19. The boat of claim 1 wherein the outer ends of said hydrofoil means are inclined upward and the connection between said hydrofoil means and said hull includes means for rotatably releasing and allowing said hydrofoil means to streamline and become approximately parallel to the longitudinal axis of the boat with said outer ends of said hydrofoil means pointing in a forward and upward direction in a water ski configuration in response to an impact force against said hydrofoil means.

20. An improved hydrofoil boat having lateral, longitudinal and vertical axes comprising:
   a hull member;
   a tail boom member attached to said hull member and extending rearward;
   ducted fan propulsion means for moving said boat through the water, said propulsive means being connected to said hull member;
   hydrofoil means connected to said hull member at an angle of inclination to the lateral axis of the boat and at an angle of sweepback from the lateral axis of the boat, said hydrofoil means serving to hydrodynamically support the boat;
   banking means connected to said hull member and to said main hydrofoil means, said banking means serving to bank the boat about its longitudinal axis;
   yawing means connected to said tail boom member and to said rear hydrofoil means, said yawing means serving to create a yawing moment about the vertical axis of the boat, and
   control means for simultaneously and proportionately activating said banking means and said yawing means to produce coordinated turns by the boat with a single movement, said control means being connected to said hull member, to said banking means and to said yawing means.

21. The boat of claim 20 wherein said banking means includes a means for inducing a differential between said angles of inclination of said hydrofoil means on the starboard and on the port sides of the boat.

22. The boat of claim 20 wherein said banking means includes a means for inducing a differential in said sweepback angles of said hydrofoil means on the starboard and on the port sides of the boat.

23. The boat of claim 20 further including conversion means for simultaneously changing the angles of inclination of said starboard and said port hydrofoil means from a surface piercing to a submerged configuration and to angular positions therebetween and thereabout, said conversion means being connected to said hydrofoil means and to said hull member.

24. A method of controlling a hydrofoil boat having lateral, longitudinal and vertical axes, including the steps of: providing a hull member and propulsive means attached thereto; providing hydrofoil means for hydrodynamically supporting the boat; providing means for connecting said hull to said hydrofoil means at an intersection; providing means for steering the boat; and moving said hydrofoil means selectably between a submerged position approximately parallel to the lateral axis of the boat, wherein said hydrofoil means and said intersection are submerged, and a surface-piercing configuration wherein said intersection and a portion of said hydrofoil means are above the surface of the water, whereby the optimum hydrofoil configuration may be selected for various operating speeds, water surface conditions and water depths.

25. The method of claim 24 wherein the steps of providing means for steering the boat includes the steps of:
   banking the boat by inducing differential angles of inclination between said hydrofoil means on the port and on the starboard sides of the boat to bank the boat;
   yawing the boat simultaneously with said banking; and
   controlling the amount of bank and yaw to produce coordinated turns.

26. The method of claim 25 wherein the step of yawing the boat includes the further steps of:
   providing a hydrofoil wing having positive dihedral connected to said hull member at a horizontal distance from the center of gravity of the boat and at a vertical distance below the longitudinal axis of the boat; and
   rotating said hydrofoil wing in an arc about a line approximately parallel to the longitudinal axis of the boat to create a side force to yaw the boat.

27. The method of claim 24 wherein the step of providing means for steering the boat includes the steps of:
   banking the boat by inducing a differential between the angles of sweepback of said hydrofoil means on the port and on the starboard sides of the boat;
   yawing the boat simultaneously with said banking; and
   controlling the amount of bank and yaw to produce coordinated turns.

28. The method of claim 27 wherein the step of yawing the boat includes the further steps of:
   providing a hydrofoil wing having positive dihedral connected to said hull member at a horizontal distance from the center of gravity of the boat and at a vertical distance below the longitudinal axis of the boat; and rotating said hydrofoil wing in an arc about a line approximately parallel to the longitudinal axis of the boat to create a side force to yaw the boat.

29. A low drag method of yawing a hydrofoil boat about its vertical axis including the steps of:
providing a hull member and propulsive means attached thereto;
providing hydrofoil means connected to said hull for hydrodynamically supporting the boat;
providing a submerged hydrofoil wing having a fixed positive dihedral angle connected to said hull member at a horizontal distance from and aft of the center of gravity of the boat and at a vertical distance below the longitudinal axis of the boat; and rotating said hydrofoil wing about a line approximately parallel to the longitudinal axis of the boat to create a side force to yaw the boat.

30. An improved hydrofoil boat comprising:
a hull member and steering means and propulsive means attached thereto;
hydrofoil means for hydrodynamically supporting the boat, said hydrofoil means having at least one end which is inclined upward;
means for connecting said hydrofoil means to said hull member and also for rotatably releasing and allowing said hydrofoil means to streamline, whereby said hydrofoil means becomes approximately parallel to the longitudinal axis of the boat with said end inclined in an upward and forward direction, in response to an impact force against said hydrofoil means.

* * * * *